(12) United States Patent
Odhner

(10) Patent No.: US 7,388,700 B1
(45) Date of Patent: Jun. 17, 2008

(54) BALL JOINT GIMBAL MIRROR WITH ACTUATOR ASSEMBLY

(75) Inventor: Jefferson E. Odhner, Amherst, NH (US)

(73) Assignee: Bae Systems Information and Electronic Systems Integration Inc., Nashua, NH (US)

( * ) Notice: Subject to any disclaimer, the term of this patent is extended or adjusted under 35 U.S.C. 154(b) by 104 days.

(21) Appl. No.: 11/413,684

(22) Filed: Apr. 28, 2006

(51) Int. Cl.
*G02B 26/08* (2006.01)

(52) U.S. Cl. ...................................... 359/224

(58) Field of Classification Search ........ 359/223–226, 359/290, 291, 871–873
See application file for complete search history.

(56) References Cited

U.S. PATENT DOCUMENTS

| | | | |
|---|---|---|---|
| 3,977,707 A | 8/1976 | Oliver | |
| 4,332,365 A | 6/1982 | Berk | |
| 4,353,615 A | 10/1982 | Kramer et al. | |
| 4,558,604 A | 12/1985 | Auer | |
| 4,649,925 A | 3/1987 | Dow et al. | |
| 6,326,759 B1 | 12/2001 | Koerner et al. | |
| 6,396,233 B1 | 5/2002 | Christison et al. | |
| 6,820,846 B2 * | 11/2004 | Knoski | 248/178.1 |
| 2003/0178528 A1 | 9/2003 | Zoppitelli et al. | |

OTHER PUBLICATIONS

Biaxial Gimbals, Schaeffer Magnetics Division, [online], [retrieved on Apr. 28, 2006], pp. 1-12. Retrieved from the Internet <URL http://www.moog.com/Media/1/Biax%20Intro.pdf>.
Ceramic Servos Move Piezo Technology Further, Engineering Talk. com, [online], [retrieved on Apr. 28, 2006], pp. 1-3. Retrieved from the Internet <URL http://www.engineeringtalk.com/news/mie/mie154.html>.

* cited by examiner

*Primary Examiner*—Euncha P Cherry
(74) *Attorney, Agent, or Firm*—Vern Maine & Associates

(57) ABSTRACT

Compact scanning techniques that can scan a large degree optical solid angle are disclosed. One particular embodiment is a processor controlled scanner that is capable of a large degree optical solid scan angle. Dual axis scan capability can be provided with a single compact package. A pivoting ball joint on which a mirror assembly is attached is employed. The mirror assembly is operatively coupled to an actuator assembly (e.g., electro-magnets or piezoelectric based actuators). When control voltage is applied to the actuator assembly, the ball joint to moves thereby moving the integrally attached mirror assembly.

20 Claims, 8 Drawing Sheets

BALL JOINT GIMBAL MIRROR WITH ACTUATOR ASSEMBLY

FIELD OF THE INVENTION

The invention relates to optics, and more particularly, to gimbal techniques for moving an optical mirror.

BACKGROUND OF THE INVENTION

There are many conventional ways to scan a laser beam over a solid angle. However, each of these conventional scanning techniques is associated with one or more problems.

For example, dual galvanometers are used in many scanning operations, but have a large dual axis. Dual acousto-optic scanners, dual electro-optic scanners, and dual electro-optic scanners are each associated with a small scan angle (6 optical degrees or less). Dual electro-optic scanners are also physically very large. Dual resonant scanners are associated with a difficult random axis in solid angles unless there is a mechanism to change the resonance of each axis. Dual "stress optical beam" scanners have a small scan angle (15.5 optical degrees using GaAs). Dual gradient liquid crystal scanners also exhibit a small scan angle (0.57 optical degrees). Dual MEMS electro-static scanners have a small scan angle (<30 degree optical scan angle) and a small aperture (1-2 mm). Risley prism scanning assemblies exhibit beam distortion at the edge of scan and an anomaly at zero degree scan angle. Also, for multiple wavelengths, each Risley prism scans at a different angle unless a reflective Risley is used which is quite large. Spinning hologon, dual rotating polygon (transmissive or reflective), trepanning (move the lens), and dual rotating gratings are all scanning techniques associated with a large size. Dual phased arrays exhibit low power density.

A combination of any of these conventional single axis scanning techniques can also be used to make a dual axis scanning system. However, such a combination merely provides a combination of the associated problems.

What is needed, therefore, are compact scanning techniques that can scan a large degree optical solid angle.

SUMMARY OF THE INVENTION

One embodiment of the present invention provides a scanning mechanism that includes a ball bearing integrally connected to a mirror assembly and a ball bearing socket that allows the ball bearing to rotate over an angle range (e.g., such as angles between 5 and 50 degree, or greater than 50 degrees). In addition, an actuator assembly is attached to the mirror assembly, for moving the mirror assembly in response to applied control signals. The scanning mechanism may further include control circuitry for providing the control signals. In one particular configuration, the actuator assembly includes a magnet-coil arrangement that is operatively coupled to the mirror assembly, that moves the mirror assembly in response to applied control signals. In one such case, the actuator assembly includes a donut-shaped coil, and a magnet attached to the mirror assembly, wherein the magnet moves within the coil in response to applied control signals, thereby moving the mirror assembly. The donut-shaped coil can be, for example, one of a plurality in a coil stack, and control signals can be sequentially applied to the coils in the stack thereby causing the magnet to move within the stack. In another such particular case, the actuator assembly has two to four of the coil stacks, each having a corresponding magnet that moves within its coil stack in response to applied control signals, thereby providing multi-axis scanning capability. In another such particular case, the actuator assembly includes four stacks of donut-shaped coils, and four magnets. Each magnet is flexibly attached to the mirror assembly, wherein each magnet moves within a corresponding coil stack in response to applied control signals, thereby moving the mirror assembly. In one such configuration, each coil stack has two to four coils, and control signals can be sequentially applied to the coils in each stack thereby causing the corresponding magnet to move within that stack. The scanning mechanism may include a base that provides support for each of the coil stacks and includes a neck that extends to support the ball bearing socket. The mirror assembly may include, for example, a mirror mounted to a mirror mount, which is in turn integrally attached to the ball bearing. In another particular configuration, the actuator assembly includes a piezoelectric motor, and a ceramic post attached to the mirror assembly and operatively coupled to the piezoelectric motor, wherein the ceramic post moves in response to applied control signals, thereby moving the mirror assembly. In one such case, the actuator assembly includes two piezoelectric motors operatively coupled to the mirror assembly so as to provide multi-axis scan capability. In another such particular case, the actuator assembly includes one or more Nanomotion piezoelectric motors operatively coupled to the mirror assembly. In another particular configuration, the ball bearing socket comprises a self-lubricating material (e.g., graphite, PTFE, and $MoS_2$ compounded or bonded with reinforcing materials and/or resins). Note that the magnets or ceramic posts (depending on the actuator assembly) can be attached to the mirror assembly by a flexure or other spring-like mechanism. Alternatively, the magnets or ceramic posts can be directly attached (if acceptable to desired performance goals). Numerous variations will be apparent in light of this disclosure.

The features and advantages described herein are not all-inclusive and, in particular, many additional features and advantages will be apparent to one of ordinary skill in the art in view of the figures and description. Moreover, it should be noted that the language used in the specification has been principally selected for readability and instructional purposes, and not to limit the scope of the inventive subject matter.

Figure 1A:
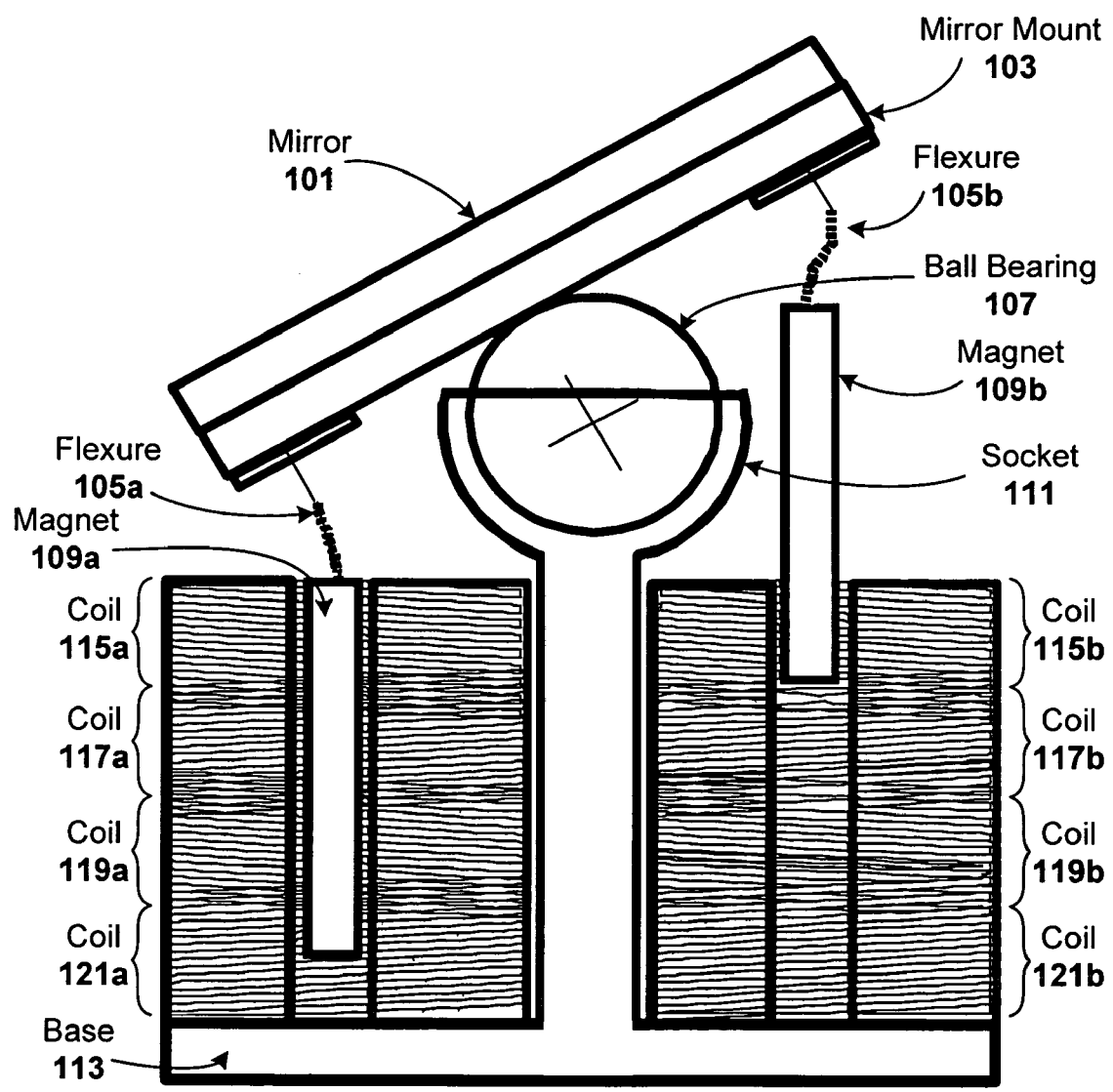
FIGS. 1a-c illustrate a cross-section side view diagram of a multi-axis gimbaled scanner configured in accordance with an embodiment of the present invention.

Note that the figures use like reference numerals to identify like elements. A letter after a reference numeral, such as "109a," indicates that the text refers specifically to the element having that particular reference numeral. A reference numeral in the text without a following letter, such as "109," refers to any or all of the elements in the figures bearing that reference numeral (e.g. "109" in the text refers to reference numerals "109a," "109b," "109c," and/or "109d" in the figures).

DETAILED DESCRIPTION OF THE INVENTION

Compact scanning techniques that can scan a large degree optical solid angle are disclosed.

General Overview

One particular embodiment is a processor controlled scanner that is capable of a large degree optical solid scan angle. Dual axis scan capability is provided with a single compact package (e.g., plastic or polymer package). Numerous applications can benefit from such a large angle compact optical scanner, such as countermeasure and tracking applications.

A pivoting ball joint on which a mirror assembly is attached is employed. The mirror assembly is operatively coupled to an actuator assembly. In one particular embodiment, the actuator assembly includes one or more magnets that slide in and out of wire coils (electro-magnets). When voltage is applied to a coil, the magnet tries to align its respective magnetic field with that of opposite polarity of the coil, thereby causing the ball joint to move, which in turn cause the attached mirror to move to a particular position. Multiple coils for each magnet can be used to create a "rail gun" effect that allows the mirror to move at exceptional speeds. Multiple magnets enable a multi-axis system. In another particular embodiment, the actuator assembly includes a piezoelectric drive mechanism.

In one particular configuration, a ball joint gimbal mirror scanner is configured to be compact (e.g., 23 mm×19 mm×19 mm space, without control electronics) and subsequently has low weight (e.g., <4 ounces without the control electronics, using a beryllium scan mirror and mount). A large optical scan angle (e.g., 60 degrees or more) is also enabled. A large aperture (e.g., 16 mm diameter) is also enabled. Optical scan efficiency is nearly 100% depending on nature of scan. Optical power density depends on mirror coating, but a typical power density is 500 MW/cm$^2$ CW or 10 J/cm$^2$ [28 nsec pulse].

The scan speed depends on a number of factors and the particular type of actuator assembly employed. For instance, where the actuator assembly is a coil-magnet assembly, the scan speed depends on number of windings in coils, permanent magnet strength, number of coils and how power is applied to them, how much power is applied, friction between ball bearing and ball bearing capture, and weight of mirror and mirror mount. Some of these factors equally apply to an actuator assembly implemented with a piezoelectric drive mechanism (e.g., desired power, friction between ball bearing and ball bearing capture, and weight of mirror assembly). Example scan speeds are in the range of the tens of kilohertz region.

The scan resolution generally depends on the actuator drive circuitry, which in one embodiment is implemented with a digital signal processor (DSP) and digital driver. In one such a case, a 16-bit resolution over a 30 degrees mechanical scan angle is enabled. This represents an optical pointing resolution of 16 micro-radians. ([0.017 rads/degrees]*60 degrees/$2^{16}$). Assuming a stable power supply, pointing stability is on the order of the scan resolution (e.g., 16 micro-radians).

Power requirements depend, for example, on the desired scan speed and current handling capability of the coils. A DSP controlled pulsed drive system can be used to reduce power consumption. Various processor and driver arrangements can be used, as will be apparent in light of this disclosure.

Coil-Magnet Actuator Assembly

Figure 1B:
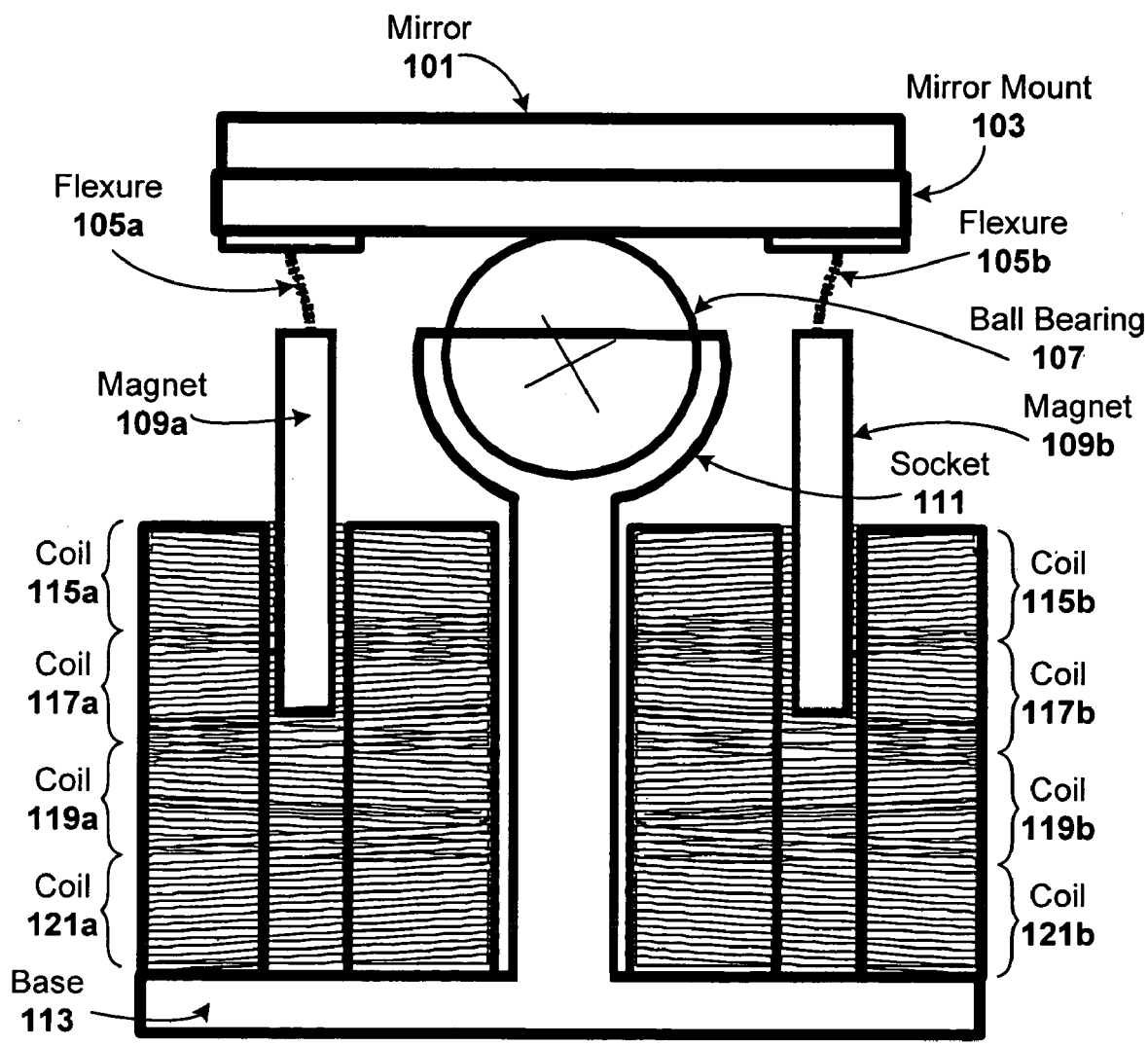
Figure 1C:
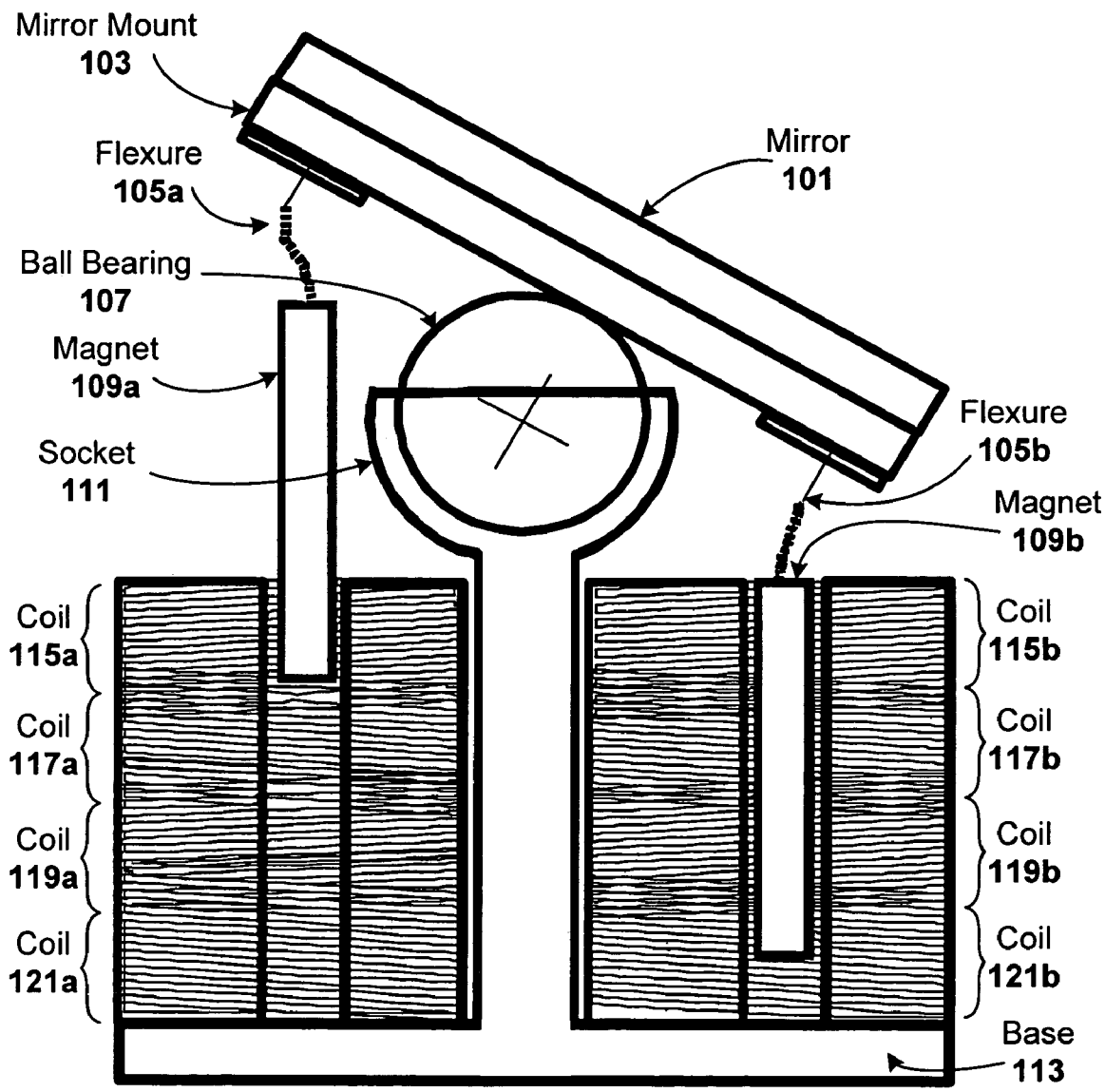

FIGS. 1a-c illustrate a cross-section side view diagram of a multi-axis gimbaled scanner configured in accordance with an embodiment of the present invention. Collectively, FIGS. 1a, 1b, and 1c show the scanner at three different mirror positions along a single plane.

The scanner includes a mirror 101 mounted to a mirror mount 103, which is in turn integrally attached to a ball bearing 107. A socket 111 allows the ball bearing 107 to rotate over a large angle range. Each of four magnets 109 (only two shown in the cross-section side view) are attached to the back of the mirror mount 103 with a flexure 105. Each of the magnets 109 interact with a stack of donut-shaped coils 115, 117, 119, and 121, such that the magnets 109 move within the coil stack, in response to applied control voltages. A base 113 provides support for each of the four coil stacks (only two shown in the cross-section side view) and includes a neck that extends to support the socket 111. A housing of suitable non-magnetic material (e.g., plastic or aluminum) can be used to hold coils 115, 117, 119, 121 in place on the base 113. Alternatively, the coils 115, 117, 119, 121 can be epoxied or otherwise bonded in place (with no external housing other than base 113). Various assembly/fastening techniques will be apparent in light of this disclosure. In addition, note that various coil shapes and configurations can be implemented, although the donut-shape provides a relatively easy fabrication process. Other embodiments may use, for example, box-shaped coils that provide a similar magnetic field, or an arrangement of individually energized coils that are arranged about each magnet, so as to provide a rail gun like magnetic field.

The scanner can be used to scan a mirror over a large scan angle using a minimal amount of space. In particular, FIG. 1a demonstrates a mirror position of X=30 degrees and Y=0 degrees in a given plain; FIG. 1b demonstrates a mirror position of X=0 degrees and Y=0 degrees (no tilt) in that plane; and FIG. 1c demonstrates a mirror position of X=−30 degrees and Y=0 degrees in that plane. Thus, a scan angle of 60 degrees is enabled. Even larger scan angles can be enabled, for example, by reducing the back end of the mirror mount, and/or by further extending the socket 111 (e.g., longer neck on base 113) and length of flexures 105.

The mirror 101 can be mounted directly on top of the mirror mount 103, for example, with contact cement or another suitably stiff adhesive (e.g., epoxy). The ball bearing 107 is integrally attached to the mirror mount 103, for example, by welding or a suitably stiff adhesive (e.g., epoxy). The ball bearing 107 can be machined or otherwise formed with a flat spot to further facilitate coupling with the mount 103. In one particular embodiment, the ball bearing 107 and the mount 103 are formed as a single unit (e.g., by a cast casting or injection molding process). Note that in other embodiments, the mirror 101 can be similarly attached to the ball bearing 107 (i.e., no mount 103). In any case, the design shown allows the ball bearing 107 to rotate in the socket 111 over 30 degrees of mechanical angle in any direction from normal. Other mechanical angle ranges can be used, as will be apparent in light of this disclosure.

The socket 111 effectively captures ball bearing 107. In one particular configuration, the socket 111 is fabricated from two halves that are sandwiched together with the proper pressure to allow free movement of the ball bearing 107 while allowing minimal jitter. Rather than have an oil or grease interface between the ball bearing 107 and the socket 111 (which could be susceptible to jitter), the socket 111 material can be made with a self-lubricating material such as graphite or other such material that can be in direct contact with the ball bearing 107 to prevent jitter. The ball bearing 107 can be, for example, aluminum (or other non-magnetic metal material) or a hard composite material (e.g., non-metallic or partially metallic). In order to securely capture the ball bearing 107, the walls of the socket 111 go up past the half way point of the ball bearing 107.

Attached to the underside of the mirror mount 103 are the four magnets 109 (with 109a and 109b shown, and 109c and 109d not shown). Each magnet 109 is attached by a corresponding flexure 105, which can be implemented with flexible spring material that easily flexes but has negligible elongation. In one particular embodiment, each flexure 105 is a rubber or silicone with fiberglass strands embedded in one direction within it. Such a construction would allow the flexure 105 to bend easily but not stretch. Each magnet 109 is arranged to slide snuggly in and out of the corresponding coil arrangement (which in this embodiment includes a stack of four coils), depending on the control voltages applied. In other embodiments, the magnets 109 can be coupled directly to the mirror mount 103 (or mirror 101), if appropriate to do so given the demands of that particular application.

Figure 1D:
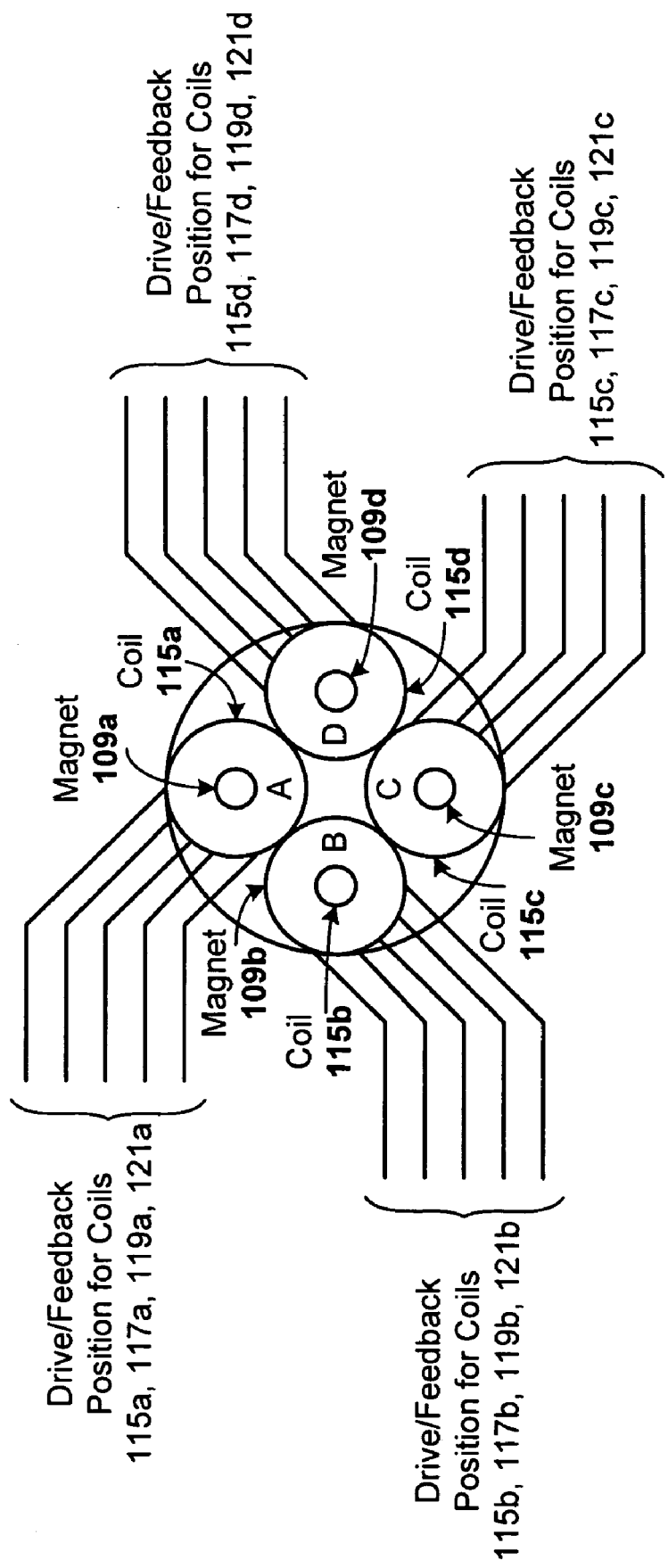
FIG. 1d illustrates a top view diagram of the multi-axis gimbaled scanner shown in FIGS. 1a-c (with the mirror and mirror mount removed).

FIG. 1d illustrate a top view diagram of the multi-axis gimbaled scanner shown in FIGS. 1a-c. As can be seen, there are four sets of coils (stacks A, B, C, and D). Only the top coil 115 of each stack is visible in this top view. With four coils in each stack (as shown in FIGS. 1a-c), there are a total of sixteen coils in this embodiment. Each coil can be activated sequentially with the proper polarity to interact with the magnets so as to cause the appropriate angle movement, as will be explained in turn. Each coil has a control line for drive and feedback signals. In this embodiment, there are four coils in each stack (one control/feedback position line per coil) and one common line for each stack (which reduces the number of leads required). Thus, in this example embodiment, there are five leads per stack.

In alternative embodiment, a different number of coils can be used. For instance, in one such embodiment, there are only four coils (one coil in each of four stacks). In another such embodiment, there are eight coils (two coils in each of four stacks). Note, however, that using fewer coils will generally increase the size of the device.

Other embodiments can be implemented with fewer stacks, pending on the desired scan angles. For instance, one such embodiment can be implemented with three coil stacks, and still provide a fairly broad range of dual-axis scan angles. In such a configuration, the three corresponding magnets 109 can couple to the mirror mount 103 in a triangular pattern (as opposed to the box pattern shown in FIG. 2). In more detail, the three coil stacks (e.g., A, B, and C) could be bonded on to the base 113 and to each other (e.g., A to B, B to C, and C to A). One coil stack could be aligned with the center line of the mirror mount 103, so that the corresponding magnet 109 would be tethered to the end of the mirror mount 103 on the center line. The other two stacks would each be equally offset from the center line at the other end of the mirror mount 103 (and on opposite sides of the center line), so that the corresponding magnets 109 would be tethered to that other end of the mirror mount 103 on each side of the center line. By moving each of the magnets 109 in the appropriate up/down direction, numerous scan angles could be achieved.

Another such alternative embodiment can be implemented with two coil stacks and corresponding magnets 109 and flexures 105. Movement of the ball bearing 107 and mirror mount 103 assembly (along with the mirror 101) based on movement of magnets 109 is achieved similarly to the three and four stack embodiments, with fewer achievable scan angles. Another such alternative embodiment can be implemented with one coil stack and a corresponding magnet 109 and flexure 105 coupled to one end of the mirror mount 103, with the other end of the mirror mount 103 untethered. Here, the single magnet 109 would rise and fall pursuant to applied control signals (as with magnets of the two, three, and four stack embodiments), effectively rocking the ball bearing 107 and mirror mount 103 assembly (along with the mirror 101) to scan in a single plane. Numerous coil/magnet combinations and tethering schemes can be used in conjunction with the ball joint as described herein to achieve scan angles suitable for any number of scan applications.

As previously explained, the use of multiple coils for each magnet and sequentially activating each coil as the magnet passes through it creates a rapidly accelerating speed similar to the phenomenal speed achieved with rail guns. By causing the magnet or magnets to move, the ball bearing is pulled and/or pushed thereby changing the mirror angle. Counter balancing pulling force on opposite coils will cause the mirror to remain stationary (processor control can be used for stability). With regard to angle tracking, a secondary coil within each drive coil can be employed to track the movement of the magnet and to provide feedback on the position of the magnet within the coil that directly correlates to the scan angle. The angle tracking accuracy is comparable to the scan resolution.

Coil-Magnet Pairs

Figure 2A:
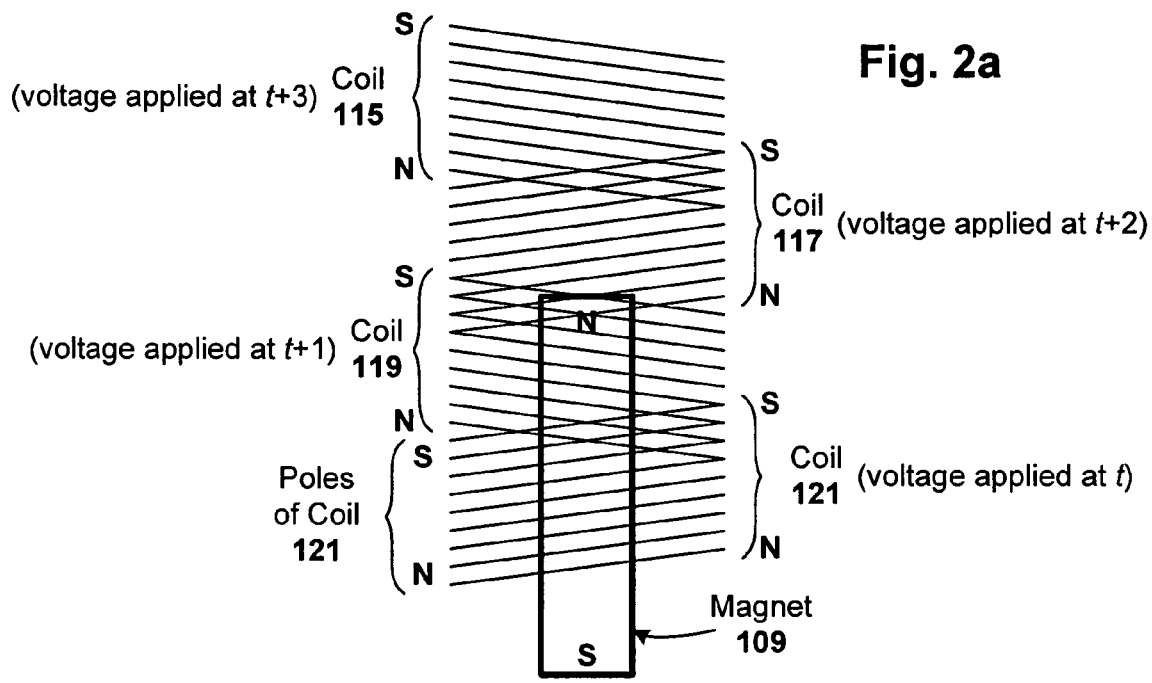
FIGS. 2a-b illustrate a magnet-coil arrangement configured for use in the multi-axis gimbaled scanner shown in FIGS. 1a-d, in accordance with an embodiment of the present invention.
Figure 2B:
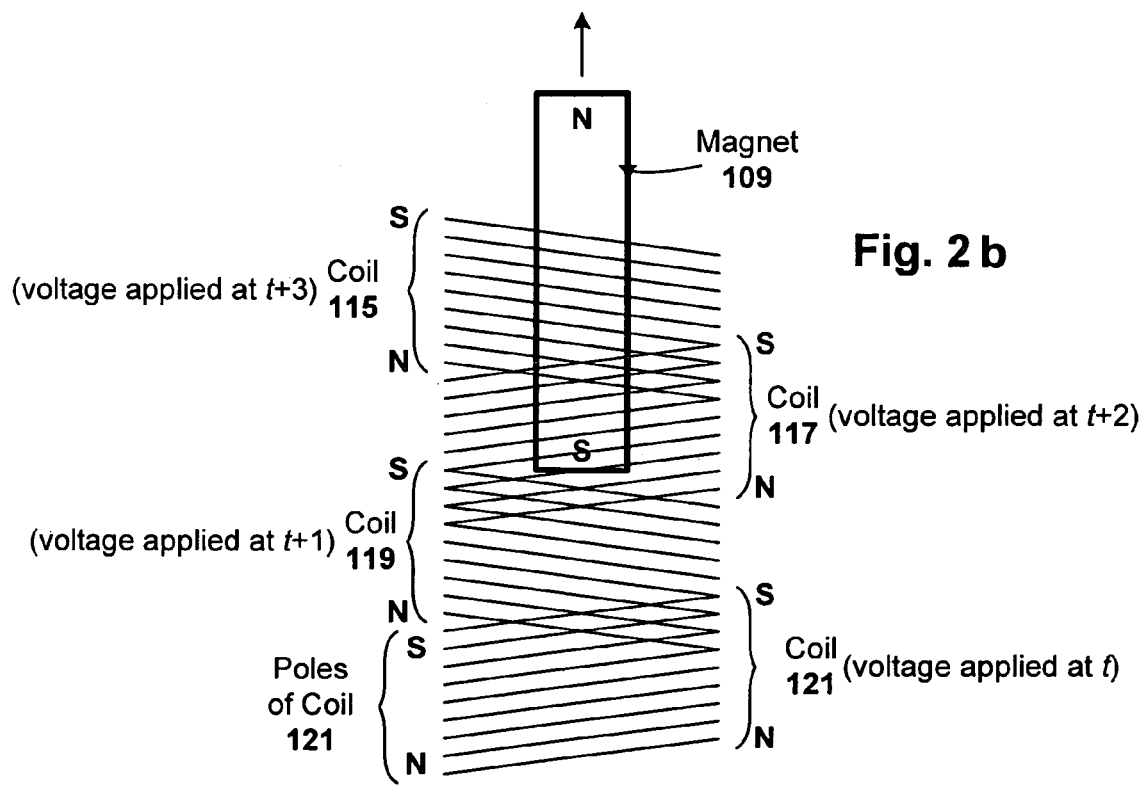

FIGS. 2a-b illustrate a magnet-coil arrangement configured for use in the multi-axis gimbaled scanner shown in FIGS. 1a-d, in accordance with an embodiment of the present invention.

The coils 115, 117, 119, 121 that surround each magnet 109 are arranged so that there is an optimal coil that can be used for each magnet position. As can be seen in this example embodiment, the magnets 109 are poled so that one pole (e.g., N) is on top and the other pole (e.g., S) is on the bottom. The coils 115, 117, 119, 121 are set up so that when they are energized by the control electronics, the poles are in opposite directions from the magnet 109 poles. Thus, when any one coil is energized, the magnet 109 will move until it is centered in that coil. If two coils (e.g., 115 and 117, or 117 and 119, or 119 and 121) are simultaneously acting on the magnet 109, the magnet 109 will move to some point in between the two coils depending on the current in each of the two coils. In this way, the magnet 109 can be moved over a large range and be made to be stationary at any point in its travel range.

In more detail, by sequentially applying voltages to the coils 115, 117, 119, 121, the magnet 109 can be made to move quickly and continuously. In the example shown in FIGS. 2a and 2b, the magnet 109 is initially positioned at the bottom of the coil stack. A control voltage is then applied to coil 121 at time t, which causes the magnet 109 to move up into the coil stack to center itself within the field of energized coil 121. Shortly thereafter, a control voltage is applied to coil 119 at time t+1, which causes the magnet 109 to move further up into the coil stack to center itself within the field of energized coil 119. Shortly thereafter, a control voltage is applied to coil 117 at time t+2, which causes the magnet 109 to move further up into the coil stack to center itself within the field of energized coil 117. Shortly thereafter, a control voltage is applied to coil 115 at time t+3, which causes the magnet 109 to move further up into the coil stack to center itself within the field of energized coil 115. In one particular embodiment, the unit of increment (e.g., t+1, t+2, t+3) in the sequenced application of control voltages is in the microsecond to millisecond range. Other embodiments may be configured with faster sequencing (e.g., nanosecond to microsecond range) while other embodiments may be configured with slower sequencing (e.g., millisecond to second range), depending on the particular application. For instance, military countermeasure applications typically track faster than commercial surveillance applications.

Complexity of this positioning arises because other coil-magnet pairs are also interacting and influencing the position of every other coil-magnet pair. Thus, the current through the magnets is controlled to provide positioning control. In one example embodiment, this current control is performed via process control (such as a DSP or other suitable processing environment) so that the current amplitude, pulse-width, duty cycle and timing can be adjusted for every coil at every mirror 101 position. A library of control words that define all desired mirror 101 positions can be stored or otherwise made accessible to the processor. Each control word will take into account the intended positioning of each magnet 109. Such a control word library can be established, for instance, based on empirical and/or theoretical data, given the parameters of a particular application.

Control Electronics

Figure 3:
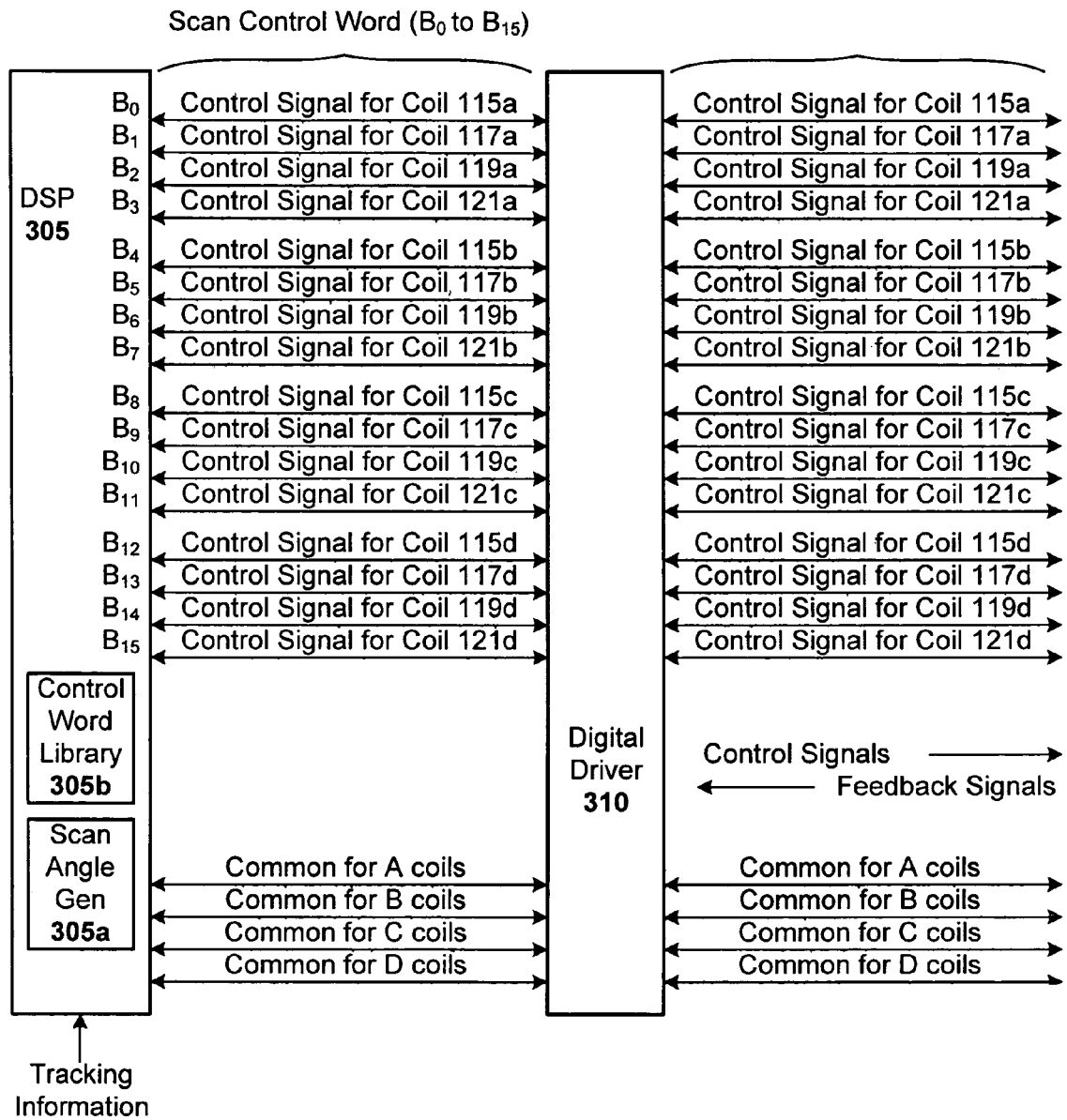
FIG. 3 illustrates control electronics configured for use in the multi-axis gimbaled scanner shown in FIGS. 1a-d, in accordance with an embodiment of the present invention.

FIG. 3 illustrates control electronics configured for use in the multi-axis gimbaled scanner shown in FIGS. 1a-d, in accordance with an embodiment of the present invention.

Tracking systems typically receive tracking information (e.g., based on tracking signals reflected from an illuminated target, or other detection system data). A conventional or custom tracking algorithm can then be used to interpret that tracking information, and then translate it into a desired scan angle (based on known gimbal parameters and capabilities). Such tracking algorithms are ideal for computing desired scan angles in non-linear environments, as they provide real-time processing needed for many high speed tracking applications (e.g., missile guidance and countermeasures).

The control electronics of this example embodiment include a DSP 305 programmed or otherwise configured with a control word library 305b and a scan angle generator 305a. The scan angle generator 305a can be implemented with any conventional or custom tracking algorithms configured to compute scan angles from received tracking information and/or position feedback from the pick-up coil. Once the scan angle is determined, the control word library 305b (e.g., look-up table including scan angles and the corresponding control word needed to achieve that angle) is accessed to identify the corresponding control word.

That control word is then output by the DSP 305 and provided to a digital driver 310, which is capable of sourcing sufficient current to each of the coils 115, 117, 119, 121 for each of the four stacks (A, B, C, and D). Thus, the gimbaled scanner will move to that scan angle. In this particular embodiment, the digital driver 310 is bidirectional, so that feedback position signals can be provided from the pick-up coils to the DSP 305, for scan angle computations. Note that two distinct drivers can be used here as well (one for the control signal direction, and one for the position feedback signals). Numerous control/feedback schemes can be used, and the present invention is not intended to be limited to any particular one. Other embodiments may be programmed or otherwise configured to compute the control word in real-time (rather than use a library of pre-computed control words). Such computation can be readily coded based on the known range of mirror positions, along with the corresponding magnet 109 positions for each mirror position (since each magnet position is associated with a known or otherwise definable control voltage).

Note that the drive coils serve as a built-in position feedback source for angle tracking. In more detail, feedback can be taken from the drive coil (which can also be used as the pick-up coil). The driving and pick-up functions can be time shared. If the drive coil is pulsed (driving function), the time in between the pulses can be used to detect the EMF (pick-up function) generated in that coil by the magnet. This EMF is directly proportional to the mirror angle. Alternatively, a separate coil (e.g., secondary coil within each drive coil) that picks-up the EMF generated by the magnet as it passes through the coil can be used, as previously explained.

In any case, the feedback on the magnet position within the coil can be directly correlated to the scan angle. In this way, the DSP 305 can always detect the current mirror position.

Piezoelectric Motor Actuator Assembly

This alternative actuator mechanism requires no inherent magnetic fields to create a gimbal movement. The drive motor operates based on the principal of ultrasonic standing waves in piezoelectricity. One example such drive motor is made by the company Nanomotion (a division of Johnson Electric). Other piezoelectric actuator assemblies will be apparent in light of this disclosure.

Figure 4A:
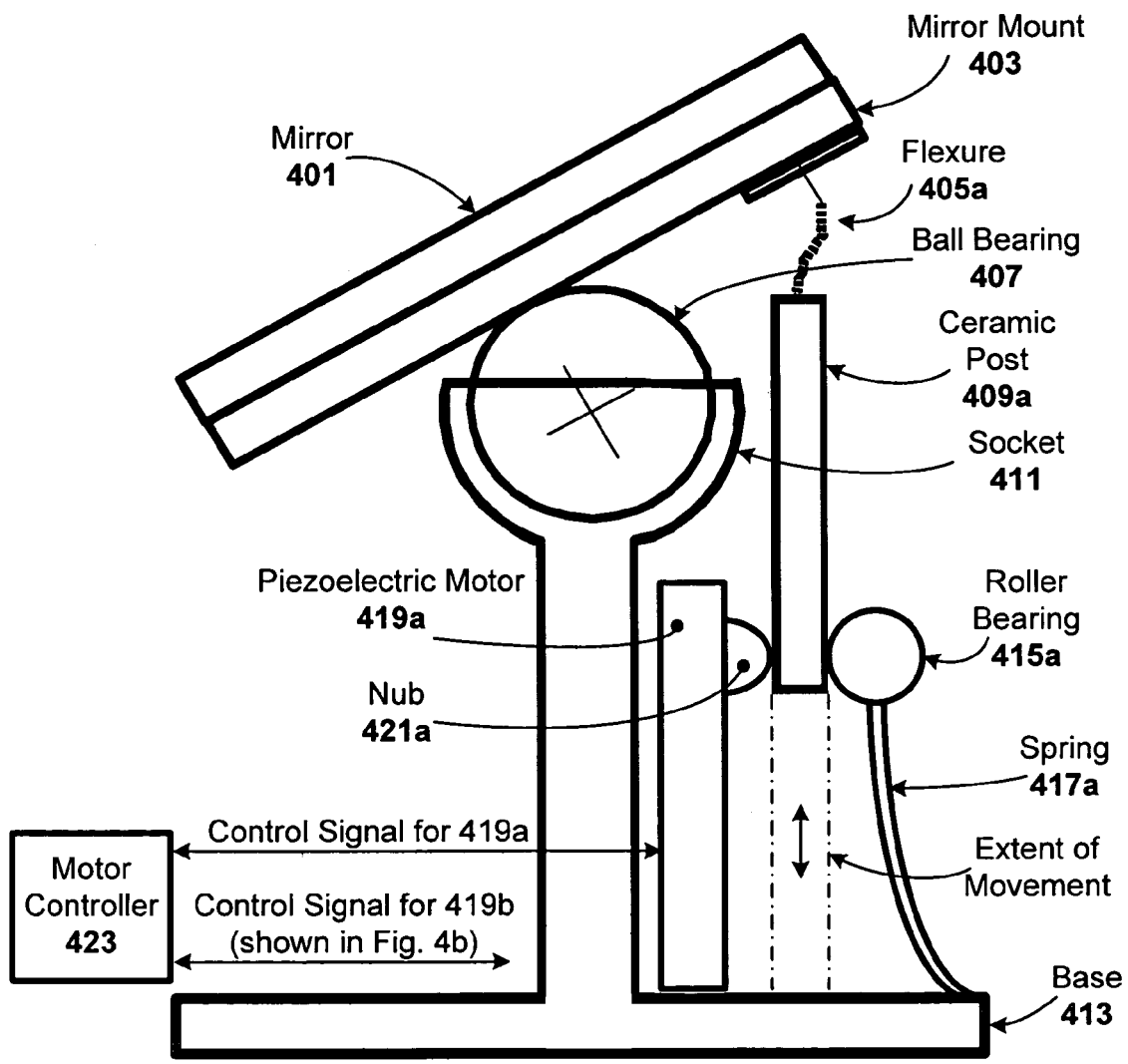
FIG. 4a illustrates a cross-section side view diagram of a multi-axis gimbaled scanner configured in accordance with another embodiment of the present invention.
Figure 4B:
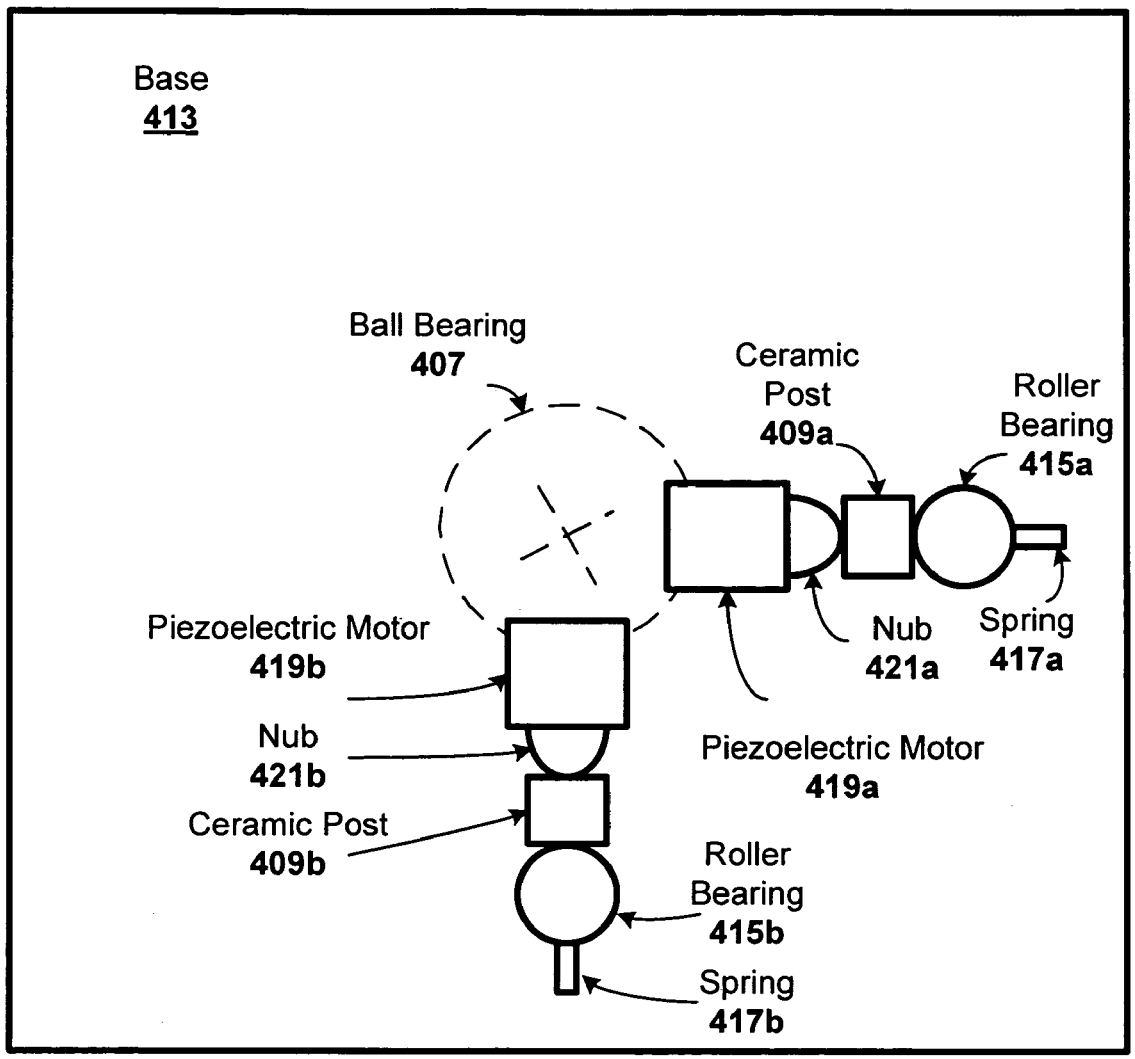
FIG. 4b illustrates a top view diagram of the multi-axis gimbaled scanner shown in FIG. 4a (with the mirror and mirror mount removed, and the ball bearing shown in phantom so as to not obstruct the view).

FIG. 4a illustrates a cross-section side view diagram of a multi-axis gimbaled scanner configured in accordance with another embodiment of the present invention, and FIG. 4b illustrates a top view diagram of that multi-axis gimbaled scanner, but with the mirror and mirror mount removed (to facilitate visualization). As can be seen, this embodiment employs piezoelectric actuator assemblies to move the ball joint and mirror assembly.

In this example configuration, the mirror 401, mirror mount 403, flexures 405, ball bearing 407, socket 411, and base 413 can each be implemented as previously discussed with reference to FIGS. 1a-c, with the relevant discussion equally applicable here. In addition, there are two Nanomotion piezoelectric actuator assemblies to provide multi-axis scan capability. Other embodiments may include only a single Nanomotion piezoelectric actuator assembly (for single axis scan applications), while still other embodiments may include three or more such assemblies for rapid multi-axis scan applications. Note that use of multiple actuator assemblies also provides a degree of redundancy for fail-proof performance.

FIG. 4a shows a side view of one of the piezoelectric actuator assemblies. The assembly is implemented with a Nanomotion piezoelectric motor assembly, which includes a piezoelectric motor 419a configured with a nub 421a. Opposing the nub 421a is a roller bearing 415a that is coupled to a spring 417a (which is in turn connected to the base 413). A second Nanomotion piezoelectric motor assembly is provided for a second scan axis (e.g., piezoelectric motor 419b, nub 421b, roller bearing 415b, and spring 417b, as shown in top view of FIG. 4b).

Attached to the underside of the mirror mount 403 are two smooth ceramic posts 409, one per each of the Nanomotion piezoelectric motor assemblies (only 409a is shown in FIG. 4a, and both 409a and 409b are shown in the top view of FIG. 4b). Each ceramic post 409 is attached by a corresponding flexure 405 (e.g., which can be implemented in a like-fashion as previously described with reference to the flexures 105 shown in FIGS. 1a-c). In other embodiments, the ceramic posts 409 can each be coupled directly to the mirror mount 403 (or mirror 401), if appropriate to do so given the demands of that particular application.

As is known, the piezoelectric effect in piezoceramics converts electrical field to mechanical strain. Under the electrical excitation drive and ceramic geometry of Nanomotion piezoelectric motor assemblies, longitudinal extension and transverse bending oscillation modes are excited at close frequency proximity. The simultaneous excitation of the longitudinal extension mode and the transverse bending mode creates a small elliptical trajectory of the ceramic post 409, thus achieving the dual mode standing wave motor.

By coupling the ceramic post 409 to the mirror assembly, a resultant driving force is exerted on the mirror assembly, thereby causing mirror movement (for scanning purposes). The periodic nature of the driving force at frequencies much higher than the mechanical resonance of the stage allows continuous smooth motion for unlimited travel, while maintaining high resolution and positioning accuracy typical of piezoelectric devices. Note that actuator travel can be linear (as shown) or rotary, depending on the desired coupling mechanism.

The motor controller 423 is programmed or otherwise configured to provide the control voltages to drive the piezoelectric motors. In one embodiment, controller 423 is implemented with closed loop servo control that can be provided with standard off-the-shelf servo controllers. Alternatively, controller 423 can be implemented with a Nanomotion servo controller that offers full PID control at 20 kHz servo rate. Note that these motors can operate in actuation mode. Alternatively, controller 423 can be implemented with a DSP programmed to deliver control voltages in a similar fashion as discussed with reference to DSP 305.

While the driving voltage (e.g., from motor controller 423) is not applied, the ceramic post 409 is stationary and generates holding torque on the mirror assembly. Unlike other braking devices, the holding torque of the Nanomotion piezoelectric motor does not cause any position shift (i.e., no feedback required). If more power is required, the Nanomotion motors are specifically built to allow for cascading. Other such piezoelectric motors, whether custom built or purchased off-the-shelf may be similarly cascaded.

The foregoing description of the embodiments of the invention has been presented for the purposes of illustration and description. It is not intended to be exhaustive or to limit the invention to the precise form disclosed. Many modifications and variations are possible in light of this disclosure. It is intended that the scope of the invention be limited not by this detailed description, but rather by the claims appended hereto.

What is claimed is:

1. A scanning mechanism, comprising:
    a ball bearing fixedly connected to a mirror assembly;
    a ball bearing socket that allows the ball bearing to rotate over an angle range; and
    an actuator assembly attached to the mirror assembly, for moving the mirror assembly in response to applied control signals.

2. The scanning mechanism of claim 1 wherein the actuator assembly comprises:
    a donut-shaped coil; and
    a magnet attached to the mirror assembly, wherein the magnet moves within the coil in response to applied control signals, thereby moving the mirror assembly.

3. The scanning mechanism of claim 2 wherein the donut-shaped coil is one of a plurality in a coil stack, and control signals can be sequentially applied to the coils in the stack thereby causing the magnet to move within the stack.

4. The scanning mechanism of claim 3 wherein the scanning mechanism has two to four of the coil stacks, each having a corresponding magnet that moves within its coil stack in response to applied control signals, thereby providing multi-axis scanning capability.

5. The scanning mechanism of claim 4 wherein the angle range is greater than 50 degrees.

6. The scanning mechanism of claim 4 further comprising:
    a base that provides support for each of the coil stacks and includes a neck that extends to support the ball bearing socket.

7. The scanning mechanism of claim 1 wherein the mirror assembly includes a mirror mounted to a mirror mount, which is in turn fixedly attached to the ball bearing.

8. The scanning mechanism of claim 1 wherein the ball bearing socket comprises self-lubricating material.

9. The scanning mechanism of claim 1 wherein the actuator assembly is attached to the mirror assembly by a flexure.

10. The scanning mechanism of claim 1 further comprising control circuitry for providing the control signals.

11. The scanning mechanism of claim 1 wherein the actuator assembly comprises:
    four stacks of donut-shaped coils; and
    four magnets, each flexibly attached to the mirror assembly, wherein each magnet moves within a corresponding coil stack in response to the applied control signals, thereby moving the mirror assembly.

12. The scanning mechanism of claim 11 wherein each coil stack has two to four coils, and control signals can be sequentially applied to the coils in each stack thereby causing the corresponding magnet to move within that stack.

13. The scanning mechanism of claim 1 wherein the actuator assembly comprises a magnet-coil arrangement operatively coupled to the mirror assembly, that moves the mirror assembly in response to applied control signals.

14. The scanning mechanism of claim 1 wherein the actuator assembly comprises one or more piezoelectric motors operatively coupled to the mirror assembly.

15. The scanning mechanism of claim 1 wherein the actuator assembly comprises:
    a piezoelectric motor; and
    a ceramic post attached to the mirror assembly and operatively coupled to the piezoelectric motor, wherein the ceramic post moves in response to applied 1 control signals, thereby moving the mirror assembly.

16. The scanning mechanism of claim 1 wherein the actuator assembly comprises two piezoelectric motors operatively coupled to the mirror assembly so as to provide multi-axis scan capability.

17. A scanning mechanism, comprising:
    a ball bearing fixedly connected to a mirror assembly;
    a ball bearing socket that allows the ball bearing to rotate over an angle range of 50 degrees or more;

a donut-shaped coil; and a magnet attached to the mirror assembly, wherein the magnet moves within the coil in response to applied control signals, thereby moving the mirror assembly.

18. The scanning mechanism of claim 17 wherein the donut-shaped coil is one of a plurality in two to four coil stacks, each stack having a corresponding magnet that moves in response to applied control signals, thereby providing multi-axis scanning capability.

19. A scanning mechanism, comprising:

a ball bearing fixedly connected to a mirror assembly;

a ball bearing socket that allows the ball bearing to rotate over an angle range of 50 degrees or more;

a first piezoelectric motor; and a first ceramic post attached to the mirror assembly and operatively coupled to the first piezoelectric motor, wherein the first ceramic post moves in response to applied control signals, thereby moving the mirror assembly in a first axis.

20. The scanning mechanism of claim 19 further comprising:

a second piezoelectric motor; and a second ceramic post attached to the mirror assembly and operatively coupled to the second piezoelectric motor, wherein the second ceramic post moves in response to applied control signals, thereby moving the mirror assembly in a second axis.

* * * * *